H. A. CARPENTER & A. W. WARNER.
CONTROL MECHANISM FOR CHARGING AND DISCHARGING MACHINES.
APPLICATION FILED DEC. 19, 1914.

1,229,225.

Patented June 12, 1917.
4 SHEETS—SHEET 1.

FIG. 1.

WITNESSES

INVENTORS

H. A. CARPENTER & A. W. WARNER.
CONTROL MECHANISM FOR CHARGING AND DISCHARGING MACHINES.
APPLICATION FILED DEC. 19, 1914.

1,229,225.

Patented June 12, 1917.
4 SHEETS—SHEET 2.

UNITED STATES PATENT OFFICE.

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

CONTROL MECHANISM FOR CHARGING AND DISCHARGING MACHINES.

1,229,225. Specification of Letters Patent. Patented June 12, 1917.

Application filed December 19, 1914. Serial No. 878,108.

*To all whom it may concern:*

Be it known that we, HENRY A. CARPENTER and ARTHUR W. WARNER, citizens of the United States, residing at Sewickley, in the county of Allegheny, State of Pennsylvania, have invented certain new and useful Improvements in Control Mechanism for Charging and Discharging Machines, of which the following is a specification.

This invention relates to improvements in gas generating apparatus and has particular relation to means for controlling the time when charging operations can take place.

In the charging of retort structures, whether the charging mechanism be in the form of mechanism for carrying the charge bodily into the retort, as by the use of a scoop structure, or mechanism which provides a conveyer action for introducing the charge into the retort, or a mechanism in which the charge is forced into the retort by pressure, one of the main essentials is that the charging mechanism, regardless of the type, be practically alined with the retort to be charged, in order that damage to the equipment may be prevented and also to prevent spilling of the coal which forms the charge.

This alining action may be had in a number of ways, as for instance, by simply inspecting the relative positions of the charging machine and retorts, but, in order that a more efficient control may be had of the charging operation, and also to provide a safety factor in connection with the operation, we have found it desirable to couple up a simple and efficient indicating means with mechanism by means of which the operations of the charging mechanism are controlled, thus making the beginning of the charging operation entirely dependent upon the relative positions of charging mechanism and retort to be charged.

A structure bearing somewhat on this general operation is disclosed in a prior application hereinafter referred to, but in view of developments in gas generating apparatus generally, and more particularly in connection with the capacity of the generating plant through the increase in number of retorts in a vertical row, the prior device is rendered less certain in operation than is the case with retort structures in which a less number of retorts are in a vertical row. Consequently, the general structure and arrangement of parts has been changed, by means of which a more efficient operation is possible and the factor of safety is materially increased, the structure being comparatively simple and effective in the control of charging mechanism regardless of the particular type of mechanism which may be employed.

To these and other ends, the nature of which will be readily understood as the invention is hereinafter disclosed, our invention consists in the improved construction and combination of parts hereinafter fully described, illustrated in the accompanying drawings, and more particularly pointed out in the appended claims.

In the accompanying drawings in which similar reference characters indicate similar parts in each of the views.

The general idea of the use of electrical mechanism for indicating the relative positions of a charger and the retort to be charged by the use of signals, such as lamps, is disclosed in a patent to Carpenter, Hibbard and Warner, Number 1,171,414, of February 15, 1916, that patent disclosing a particular type of apparatus for this purpose which is of a different structural character, operating generally on the use of a series of elements having definite positions relative to each other, a single series being provided for each vertical row of retorts, the construction providing for a number of independent contacts corresponding to the number of signals used, plus an additional contact which acts to make and break an operating circuit, these being arranged in a general vertical series somewhat displaced and occupying an amount of space such as would prevent the duplication such as would permit of independent alinement with respect to each individual retort of a vertical row. As a result, the several coöperating elements of the earlier application are fixedly carried by the charging machine itself, as are the complemental elements carried by the stack of retorts, these elements therefore having a fixed vertical position which provides for a general alining action for the vertical row as an entirety.

However, in providing various improvements to the gas generating apparatus as an entirety, which improvements are set forth in other companion applications, it has been found advantageous to provide for independently alining with each individual retort, thus insuring proper alinement in the event of slight shifting, etc., of parts such as may take place where the installation is made in connection with a stack of retorts in which the vertical rows contain a considerable number, in which case the height of the stack is considerable. For instance, the present invention has been applied for use in connection with a stack of retorts where the number of retorts in a vertical row is eight, forming what is known as an "eight-high" structure, necessitating the use of a tall machine in order that the necessary amount of vertical travel of the charging mechanism may be provided and obviously providing for a retort structure of considerable height. To avoid placing entire dependence upon locating these several elements at the top of the machine and of the retorts, the present invention has been devised with a view to restricting the number of points of contact of machine element and retort element, and thus permit of the use of retort elements corresponding in number to the number of retorts in a vertical row, the vertically movable portion of the machine carrying the coacting element so as to enable a single element to coöperate with each of the retort elements, the selection being according to the vertical height of the charging machine when contact is had.

Figure 1:
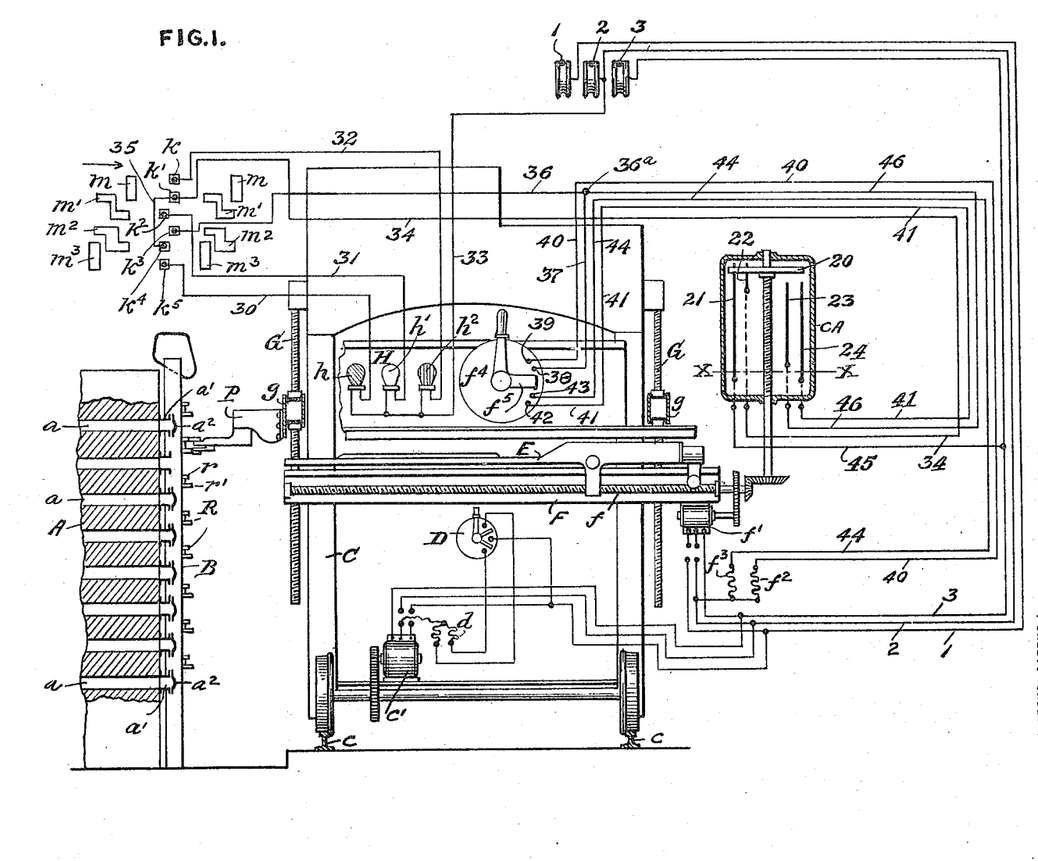
Figure 1 is a diagrammatic view showing a portion of a retort structure, and also showing diagrammatically a charging machine having travel and charging mechanism, the view disclosing the various circuit connections by means of which control of the charging operations may be had.

Referring now more particularly to Fig. 1 which is a view somewhat diagrammatic of a portion of a retort structure and of a charging machine having a charger adapted to be introduced into an open retort and withdrawn therefrom when the charger is properly alined with the retort, A designates a retort structure having retorts $a$, mouth-pieces $a'$, and doors or lids $a^2$, this retort structure being of any preferred type, it being understood that the doors or lids are adapted to be opened when it is desired to charge a retort. B designates a buck-stay or, as disclosed in the patent to Barnum and Carpenter, No. 1,091,111 of March 24, 1914, this may be a stand-pipe to which the retorts are connected, it being understood, of course, that the buck-stay or standpipe B is located between vertical rows of retorts.

C designates a charging machine adapted to travel on tracks $c$ by suitable power devices, such as a motor $c'$ adapted to receive current from a suitable source of supply, represented in this figure by three conductors 1, 2 and 3, these being the conductors of a three-phase system which may be employed in connection with the various operations of the charging machine, one only (the charging operation) being disclosed in the present application, these conductors being connected to the motor $c'$ by suitable leads, presently referred to, the motor being a reversible motor controlled by what we term a travel control D, by means of which not only the time of operation of the motor $c'$ may be controlled, but also its direction of rotation, the latter determining the direction of travel of the charging machine on tracks $c$, this control being by means of suitable solenoid operated switches indicated generally at $d$, this general arrangement being set forth in prior applications, being included herein simply for the purpose of indicating the manner in which the operator is able to provide the travel movements to the charging machine such as may be required in properly alining a charger with a predetermined retort.

As shown in said figure, the charger, indicated generally at E is mounted on a platform or track F, said platform or track being adjustable vertically by means of a series of threaded rods G connected up to what we term the hoist mechanism (not specifically disclosed herein), suitable girders $g$ being mounted on these threaded rods and to which the track F is connected, the structure being such that as the rods G are rotated in one direction or the other, the carriage and the parts carried thereby (including the operating platform) will be moved vertically to the desired point so as to place the charger in approximate vertical alinement with a retort of a horizontal row of retorts. As the operation herein disclosed is similar in each of the several vertical positions, it is not thought necessary to indicate further the particular mechanism employed for providing this hoisting operation, the specific features of which are contained in other applications.

One of the particular points to be guarded against in the operation of a charging machine is the liability of damaging the equipment by movement of the carriage or charger mechanism toward the retort before the charger is alined with the open retort sufficiently close as to practically insure the entrance of the charger without striking any of the adjacent parts. This liability is overcome, by the use of circuit connections which will complete the circuit to the carriage motor and permit its operation only when such proper alinement is had. In providing this result, we employ what we term a carriage automatic switch, indicated generally at CA which is provided with a plurality of contact bars adapted to be traversed by a connecting bar 20, the latter being moved backward and forward (vertically in Fig. 1) through suitable connections with the charger actuating device, a simple device being indicated in the drawings in the form of a threaded rod $f$ adapted to be driven by a motor $f'$ connected up in a manner presently referred to. Said carriage automatic switch as shown in the drawings has contact bars sufficient only for performing the functions particularly referred to herein. It may, however, be provided with additional contact bars.

The motor $f'$, like the motor $c'$ is connected up with the three-phase system, one wire leading direct to one of the conductors, the other wires or leads being adapted to be controlled by means of a solenoid switch device which is adapted to make and break the circuit and also provide a reversal of leads in order that the motor may be caused to travel in either direction at will. This solenoid structure is indicated in Fig. 1 as provided by two solenoids $f^2$ and $f^3$, these being connected up between two of the general leads, so that when the circuit is completed through either solenoid the switch will be actuated to connect the leads with the motor in a predetermined manner, and as long as the circuit remains complete through that solenoid the switch will retain the motor circuit complete to provide the motor operation. When the control is reversed so as to throw the circuit through the other solenoid, the switch will be closed to reverse the leads and thus reverse the direction of travel of the motor. The control mechanism for providing this result is indicated at $f^4$.

The indicating signals employed are a bank of lights indicated generally at H, and being preferably three in number, each lamp being preferably of a different color. For instance, the lamp $h$ may be green, the lamp $h'$ white, and the lamp $h^2$ red. The lamps have one of their terminals connected with one of the leads, the other terminal of the lamp being connected to a finger of the line-up structure, the several fingers being shown diagrammatically and referred to hereinafter in connection with the detailed description of the specific structure disclosed in this application.

Figure 3:
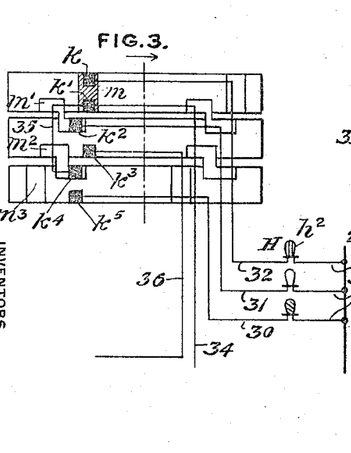
Figs. 3, 3ª and 3ᵇ are diagrammatic views showing developments of circuit make and break devices which may be employed in the invention, these views showing various positions of these features.
Figure 3A:
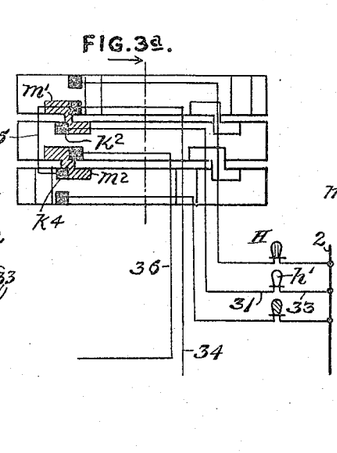
Figure 3B:
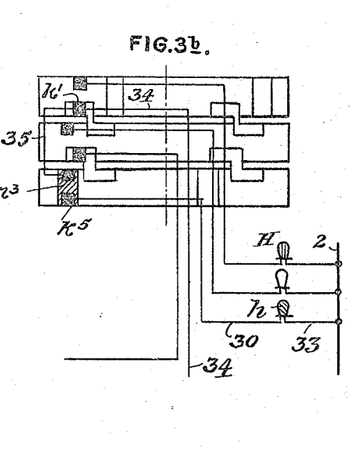

In the form shown in Figs. 1, 3, 3ª and 3ᵇ, six fingers are employed, these being indicated at $k$, $k'$, $k^2$, $k^3$, $k^4$ and $k^5$, and being adapted to coact with certain contact members which are adapted to bridge the fingers in pairs during the operation of the mechanism, a development of these contacts being shown in said figures, the contacts being shown as in two sets, this arrangement being provided for the reason that during the operation, the member which operates to bring the fingers and contacts into engagement may move in either direction, and provision is thus made to provide for the desired operation regardless of the direction of movement. This will be referred to more particularly in connection with the specific disclosure, it being understood that the fingers coöperate with either set with substantially the same result. Each set of contacts is shown as composed of four parts indicated respectively at $m$, $m'$, $m^2$ and $m^3$.

The member carried by the machine is shown diagrammatically at P in Fig. 1, and is more specifically disclosed in Figs. 4–8, being adapted to coöperate with any one of a series of members R, each of which is in the form of a pair of projecting portions, the upper indicated at $r$ being in the form of a track having an elongated surface with inclined sides, the lower member, indicated at $r'$, being of less length and also having inclined sides, but projecting outwardly beyond the front face of the track $r$.

These two members coöperate in connection with certain wheels carried by the machine member, one of which is adapted to travel on the track $r$ and act to move the machine structure inwardly, the other member $r'$ forming an abutment in the path of movement of another wheel carried by the machine element, and by means of which variable angular positions are produced, the movements provided during the variations in these angular positions acting to carry the contacts into and out of engagement with the fingers, this arrangement providing a relative movement between the fingers and the contacts, all as more fully described hereinafter. For the purpose of the present portion of the description, it is sufficient to point out that the member $r'$ has a definite position relative to the direction of length of the track $r$ and of the buck-stay or stand-pipe, and, consequently, a travel of the member P along the retorts so as to bring the member $r'$ into action, will provide a greater or less amount of throw to the mechanism dependent upon the amount of travel of the machine in its direction of movement.

As shown in Fig. 1, the lamp $h$ is connected to finger $k^5$ by means of a lead 30; lamp $h'$ is connected to finger $k^2$ by means of a lead 31, while lamp $h^2$ is connected to finger $k$ by means of a lead 32, the opposite terminals of the lamps being connected to line 2 through lead 33. Of the remaining fingers, finger $k'$ is connected, by means of a lead 34, with a contact bar 22 of the carriage automatic switch CA, and is also connected with finger $k^4$ by means of a lead 35. Finger $k^3$ is connected, by means of a lead 36, to a point $36^a$ from which it branches, by means of a lead 46, to contact bar 23 of carriage automatic switch CA, and by means of lead 37 to contact 38 on control $f^4$, which contact is adapted to be connected with contact 39 by means of bridging member $f^5$ of the control member $f^4$ and this connects finger $k^3$ to solenoid $f^2$ by means of leads 36, 37 and 40, the solenoid being connected to line 2 as shown.

The carriage automatic switch CA is also shown as provided with a contact bar 21 connected up to line 3 by lead 45 and also with a contact bar 24 connected, through lead 41 with a contact point 42 carried by the control $f^4$, said contact 42 being adapted to be connected to a contact 43 by bridge member $f^5$, and thus, through a lead 44 be connected with the solenoid $f^3$. As a result, the bridge member $f^5$ may bridge the gap of the control which leads either to solenoid $f^2$ or solenoid $f^3$, this bridging serving to connect lines 2 and 3 through either solenoid and thus energize such solenoid to close the switch which controls the motor circuit for motor $f'$.

As heretofore pointed out, the contact or cross-over 20 is adapted to travel backward and forward on the carriage automatic switch, this cross-over being shown in its position where the carriage is back; its travel is synchronous with that of the carriage, the result being that when the carriage is in its forward position, this cross-over will have reached a position corresponding to the dotted line $x$—$x$ in Fig. 1, this being the carriage forward position. The carriage then begins its return movement, thus effecting a return of the cross-over to the carriage back position shown.

As shown in Fig. 1, the normal position of the fingers is between the sets of contacts.

For the purpose of explaining the various circuits and operations of this figure, it is assumed that the movement of parts has been such as to bring the set of contacts at the left of Fig. 1 toward the fingers, the direction of the arrow in said figure. As the machine element traverses the member $r'$, the fingers and contacts will coöperate in the manner shown in Figs. 3, $3^a$ and $3^b$, these figures illustrating various combinations which coact to complete circuits for lighting the several lamps, Fig. 3 showing the combinations for lamp $h^2$, Fig. $3^a$ that for lamp $h'$, and Fig. $3^b$ that for lamp $h$. It may be stated that the arrangement is such that when the circuit for lamp $h'$ is properly completed, the charger is sufficiently closely alined with the retort as to permit its entrance thereinto without damage to the equipment, this combination (that of Fig. $3^a$) thus additionally completing the circuit for making operation of the carriage possible.

Assuming that the machine is approaching its alining position, and that the member $r'$ has provided an angularity sufficient to bring the fingers and contacts into the position shown in Fig. 3, it will be seen that a circuit is completed from line 2 to line 3 as follows: from line 2 through lead 33 to lamp $h^2$, lead 32, finger $k$, contact $m$, finger $k'$, lead 34, contact bar 22, cross-over 20, contact bar 21, lead 45, to lead 3, the result being that the circuit for lamp $h^2$ is complete, thus lighting this lamp. An inspection of the diagrams will show that the remaining circuits (excepting the travel circuit) are incomplete at this time so that no other action can be had excepting a further travel movement by means of the travel motor and control D. The lighting of this lamp will indicate to the operator that he is in a position very close to a correct alining position, and that a further movement in this direction will bring him to such alining position.

The operator on reaching the position just described and finding that he is in close alining position but not accurately alined, the lamp indicating to him the direction in which the machine is to be moved to provide for accurate alining, manipulates the travel control D to cause the machine to travel farther in this direction. As the machine moves, it will be obvious that the angularity to which reference is had elsewhere changes and thus shifts the relative positions of the fingers and contacts. If the movement has been sufficiently short to cause the fingers and contacts to assume the position shown in Fig. $3^a$, when the machine is at rest, it will be seen that the circuit connections previously described have become broken and other connections completed. For instance, instead of the circuit from line 2 to line 3 being completed through lamp $h^2$, this circuit will be completed through lamp $h'$, the circuit being from line 2, through lead 33, lamp $h'$, lead 31, finger $k^2$, contact $m'$, finger $k'$, lead 34, and to lead 3 as previously described, thus lighting lamp $h'$ and giving the operator the signal which this lamp is intended to provide. At the same time, the circuit which leads through solenoid $f^2$ and which is normally broken at two points (between fingers $k^3$ and $k^4$ and in the control $f^4$) has one of these points closed through bridging of fingers $k^3$ and $k^4$ by contact $m^2$, leaving this circuit broken only at the manual control $f^4$. If this remaining break in the circuit is closed by manipulation of the control to bridge the points 38 and 39, this solenoid circuit will be completed from line 2 to line 3 through lead 40, bridged contacts 38 and 39, point $36^a$, lead 36, finger $k^3$, contact $m^2$, finger $k^4$, lead 35, finger $k'$, lead 34, to line 3 through the carriage automatic switch as before described, thus energizing solenoid $f^2$ and starting the carriage forward and the synchronous movement of the carriage automatic switch cross-over 20 as heretofore pointed out.

From this, it will be readily understood that when the fingers and contacts are in this position, the apparatus becomes set so that by manual manipulation of the control $f^4$, the charging operation may proceed at the will of the operator. It is obvious, therefore, that this lamp will indicate the alining position. However, as will be seen from Fig. $3^a$, the retaining of the solenoid circuit closed within the line-up is dependent upon preserving the engaging of both fingers $k^3$ and $k^4$ with contact $m^2$, and since the contact is so formed and the fingers are so arranged that this completion of the circuit at this point can be had only within a very small range of action, it will be understood that this particular device is somewhat sensitive in its action, and that jarring, etc., of the machine so as to shift the angularity to some extent might be sufficient to break this circuit at this point. As such jarring action would be more likely to be had by reason of contact of the charger within the retort, it will be understood that during the earlier movements of the charger in approaching the retort, liability of the deranging of this particular make and break device would be less likely to happen and thus there would be little or no liability of the circuit becoming broken after the charger has started its operation; even if this breaking should take place while the charger was out of the retort, the liability of damaging equipment would be small.

In order, however, to prevent any liability of this circuit being broken at this sensitive structure while the charger is in the retort, provision is made for automatically rearranging the circuit so as to render the safety line-up ineffective to break the circuit after the charger has made a predetermined length of movement, this cutting-out being provided by shortening the contact bar 22 and employing contact bar 23 within the carriage automatic switch, these bars 22 and 23 overlapping so as to prevent any breaking of the solenoid circuit during the cutting-out operation. As will be readily understood by referring to Fig. 1, when the cross-over 20 has traveled downwardly a distance sufficient to pass out of contact with bar 22 and pass into contact with bar 23, a circuit will be established from line 2 to line 3 through solenoid $f^2$, lead 40, bridged contacts 38 and 39, lead 37, lead 46, contact bar 23, cross-over 20, contact bar 21, lead 45, to lead 3, a circuit independent of the circuit through the fingers $k^3$ and $k^4$. This circuit remains complete until the cross-over 20 has passed to the position indicated by dotted line $x$—$x$ in Fig. 1, at which time, the connection between contact bars 21 and 23 is broken, thus breaking the circuit of solenoid $f^2$, the deënergizing of which has the effect of breaking the motor circuit to motor $f'$.

As will be seen, the carriage automatic switch CA is also provided with a contact bar 24, and in the position of the cross-over indicated by the line $x$—$x$, it will be seen that the cross-over connects bar 21 with bar 24. Bar 24 is connected up within the circuit for solenoid $f^3$, and while this circuit is normally broken between contacts 42 and 43, it will be readily understood that with the cross-over in the position shown by dotted line $x$—$x$, in which position the circuit through solenoid $f^2$ is broken and which corresponds to the forward position of the carriage and charger, a closing of the gap between points 42 and 43 by shifting the control $f^4$, will complete a circuit from line 2 to line 3 through solenoid $f^3$, lead 44, bridged contacts 42 and 43, lead 41, contact bar 24, cross-over 20, contact bar 21, lead 45 to line 3, which has the effect of energizing solenoid $f^3$ and completing the circuit for motor $f'$ to operate the latter in a reverse direction, thus moving the carriage in a direction to return it to its initial position and at the same time cause the cross-over to retrace its travel. As will be seen, the contact 24 does not reach the carriage back position of the cross-over; similarly, the contact 23 does not reach the carriage forward position of the cross-over. In use, the carriage is permitted to coast to its carriage forward and carriage back position.

Should the operator, in moving the machine from the position where the fingers and contacts are arranged as shown in Fig. 3, provide a movement greater than that necessary to place these parts in the position shown in Fig. $3^a$, the fingers and contacts will assume the position shown in Fig. $3^b$, in which the circuit from line 2 to line 3 is completed through lamp $h$, the circuit being from line 2 through lead 33, lamp $h$, lead 30, finger $k^5$, contact $m^3$, finger $k^4$, lead 35, finger $k'$, lead 34, to line 3 in the manner hereinbefore referred to, the remaining circuits (excepting the travel circuit) being broken. As will be seen, the parts in reaching this position have passed through the position shown in Fig. 3ª, so that the movement of the machine to a stationary position where the lamp $h$ is lighted, will have caused, during its travel, a lighting of lamp $h'$ for an instant, followed by the lighting of lamp $h$. This fact will indicate to the operator that his travel has been too far and that it is necessary for him to retrace a part of this travel. This he is permitted to do by reversing the direction of travel of motor $c'$. By this manipulation backward and forward, the machine finally comes to rest with the lamp $h'$ burning, indicating that the circuit to the motor for the charger operation may be completed when the operator so desires.

The particular arrangement of fingers and contacts, as shown in Figs. 3, 3ª and 3ᵇ, is especially useful by reason of the sensitive ability to provide indications within distances relatively small. For instance, the arrangement of contacts $m'$ and $m^2$ with their coacting fingers is such as to provide for a completion of the circuits through lamp $h'$ and the remaining circuits referred to in connection with the position shown in Fig. 3ª, within a radius of action of three thirty-seconds of an inch on each side of the center line of the charger or center line of the retort; at any point within this distance of three-sixteenths of an inch, the charging operation may take place. The contacts $m$ and $m^3$ control distances beyond this three-thirty-seconds of an inch on opposite sides of the center line of the retort up to one and one-half inches from such center line, the result being that when the first lamp is lighted during the travel in approaching the particular retort to be charged, the operator is given notice that he is in close proximity to an alining position and that but small movements are required to bring the charger within the close adjustment to the center line of a retort.

Figure 6:
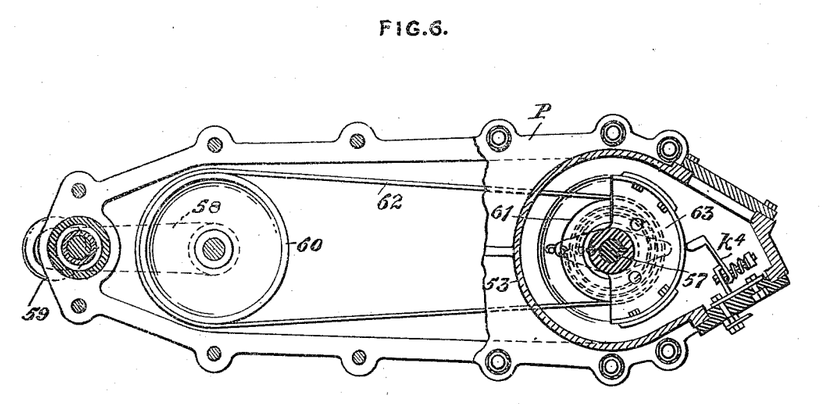
Fig. 6 is a sectional view taken on line 6—6 of Fig. 5.
Figure 7:
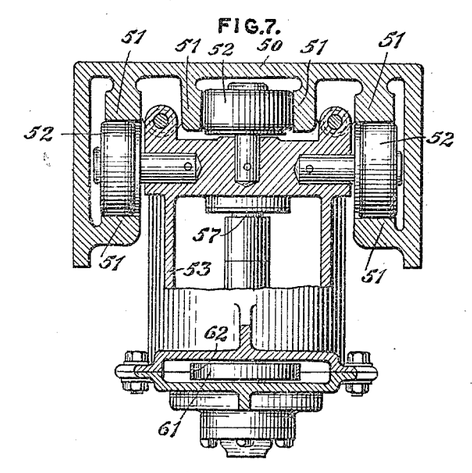
Fig. 7 is a cross sectional view taken on line 7—7 of Fig. 5.

The specific construction and arrangement of parts which we prefer to use in connection with the present invention, is more particularly disclosed in Figs. 4–8 inclusive, in which 50 designates a bracket-like structure secured at its rear to the girder $g$ and being provided with ways 51 arranged in pairs to oppose each other to form tracks, the particular arrangement in this respect being more specifically shown in Fig. 7 in which three tracks are shown, one on each side and one at the top, these tracks forming runways for wheels 52 carried by the framework of the machine carried portion of the line-up structure. As shown, a pair of wheels is adapted to travel on each track, these wheels being arranged one in front of another and thus tending to prevent wabbling of the frame-work, it being readily understood that the wheels having the horizontal axis are adapted to support the frame-work, while the wheels with the vertical axes are adapted to retain the frame against sidewise movement relative to the bracket, the structure as an entirety acting to permit a back and forth movement of the frame in substantially a single plane.

Figures 4, 5:
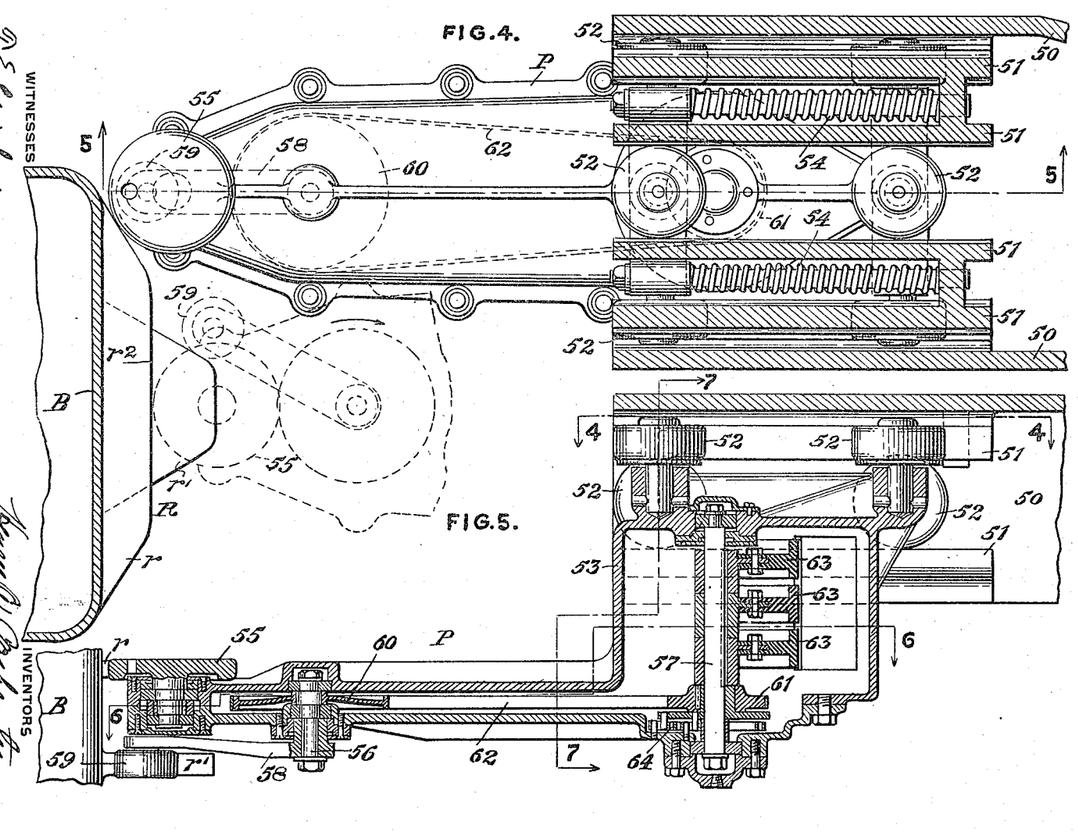
Fig. 4 is a view partly in top plan and partly in section of the complemental elements which more specifically provide the control features, this view being taken on the line 4—4 of Fig. 5.
Fig. 5 is a vertical sectional view taken on the line 5—5 of Fig. 4.

As shown more particularly in Fig. 4, the frame, which is indicated generally at 53 is normally held in a projected forward position by means of a pair of springs 54, and any movement of the frame-work in an inward direction necessarily places these springs under compression so that when the pressure which was used to retract the frame is released, the springs will act to return the frame and the parts carried thereby to the projected forward position.

This particular structure is provided more particularly to insure a proper positioning of the frame-work with respect to the retort member R, the frame-work 53 having at its forwardly projecting portion, a roller 55, the axis of which is in substantial alinement longitudinally of the frame-work with the axis of the upper wheels 52 and also the axes of shafts 56 and 57 presently referred to, the axes of these several parts extending on a vertical plane extending from front to rear of the frame-work.

In practice, the roller 55 coöperates with the track portion $r$ of the member R, the travel of the charging machine, with the frame-work 53 normally projected causing the wheel 55 to be brought into contact with one of the inclined faces of the member $r$ which lead on to the straight track portion, the result being that further movement of the machine causes the wheel 55 to traverse this inclined face and be positioned on the track surface $r^2$, necessarily placing the springs 54 under compression in reaching this position, said springs acting, therefore, to hold the wheel 55 in firm contact with the track regardless of what lateral pressures may be placed thereon, as presently referred to.

Mounted on the shaft 56 and projecting below the frame-work 53 is an arm 58, the forward end of which carries a roller 59, this roller being located in the horizontal plane of the projecting member $r'$ of the retort member R, as more particularly shown in Fig. 5. The arm 58 is keyed or otherwise secured to shaft 56, and said shaft also carries, in a manner to rotate therewith, wheel 60 connected to a wheel 61 mounted to move with shaft 57, said wheels being connected by suitable means such as a band 62, the arrangement being such that any pivotal movement of shaft 56 will be transmitted to shaft 57 and thereby operate the parts which are carried by said shaft, these parts being preferably suitable structures, as for instance collars carrying insulating supports 63, on the face of which supports are secured the contacts $m$, $m'$, $m^2$, and $m^3$. As will be obvious, the contacts may have any desired configuration, but, as heretofore pointed out, the particular arrangement shown in the developed form of Fig. 3 is preferred by reason of the ability to provide adjustment within very small lengths of travel.

The finger $k^4$ is shown more particularly in Fig. 6, and, as shown in said figure, this finger lies normally between the two sets of contacts carried by the face of the insulation members. Any movement of the shaft 56 pivotally will cause the shaft 57 to be given a similar movement, the result being that one or the other set of contacts will be brought into operative engagement with the fingers, depending upon the amount of pivotal movement of shaft 56, this difference in pivotal movement controlling the particular positions shown in Figs. 3, 3ª and 3ᵇ.

Figure 8:
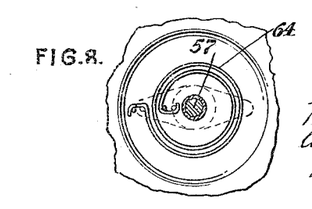
Fig. 8 is a detail of a preferred form of tension device.

The pivotal movements of shaft 57 are made in opposition to a spring tension device 64, more particularly shown in Figs. 5 and 8, by means of which the shaft is placed under a spring tension regardless of the direction in which it is rotated, so that when the pressure which provides the rotating movements is released, the device 64 will return the parts to the normal position shown in Fig. 6. The tension device shown is a simple one in which a pair of pins extending from opposing members are provided for each end of the spring, one set of pins being carried by a movable member, the other by a fixed member, the result being that as the movable member is carried about by the shaft 57, the device will be placed under tension.

The pivotal or oscillating movements of the shaft 57 are provided by the contact of wheel 59 with the member $r'$ of the retort member R. As will be seen, by the dotted line representation in Fig. 4, the movement of the machine which carries the wheel 55 on to the track face $r^2$ will bring the wheel 59 into contact with one of the inclined faces of the member $r'$. As the arm 58 is not yieldable in the direction in which the frame-work is yieldable, it will be readily understood that as the wheel 55 travels along the track, the wheel 59 will be restrained by the inclined face and thus cause the arm 58 to assume a position angular with respect to the plane which intersects the axes of the shafts 56 and 57 and wheel 55, the result being that shaft 56 is given a turning movement which, through the connected wheels 60 and 61 serves to turn the contact carriers carried by shaft 57. As will be obvious, the length of the turning movements of shaft 56 will depend entirely on the degree of angularity of arm 58 relative to such intersecting plane. Should the travel of the wheel 55 cease at a point where the arm has turned the shaft so as to bring the fingers $k$ and $k'$ into engagement with contact $m$, the circuits will be closed as indicated in Fig. 3. A further movement of the wheel 55 would change the degree of angularity of arm 58 and, consequently, increase the length of turning movement of shaft 56 and thus shift the contact carrier to change the circuits, it being understood that at one certain position of the wheel 55 on the track $r^2$, the wheel 59 will have caused such an angularity to arm 58 as to place the contacts and fingers in the position shown in Fig. 3ª, at which time the circuits will be completed in the manner shown in that figure. If the wheel 55 travels beyond this point, the angularity will be increased and the turning movement be sufficient to carry the contacts to the positions shown in Fig. 3ᵇ; when this latter occurs, it will be obvious that by simply changing the direction of travel of the machine so as to cause the wheel 55 to retrace a portion of its travel, the angularity of arm 58 will again be changed so as to cause the contact carrier to retrace a part of its travel under the action of the tension device 64.

It is to be understood that the arrangement of the parts is such that the retort member R is similarly positioned with respect to the center line of each vertical row of retorts so that the action is similar regardless of the elevation of the retort of that vertical series. A simple rule for installing the arrangement is to locate the plane intersecting the axes of shafts 56 and 57 and wheel 55 relative to the center line of the buck-stay or stand-pipe in such manner as to equal the distance between the center line of the scoops and the center line of the retort, and arrange the member $r'$ with its inclined face so as to provide the proper degree of angularity of the arm 58 to provide the position of Fig. 3ª, when the center line of the charger and that of the retort corresponds. Since the track $r$ is adjacent to and made in one piece with the member $r'$, no distortion or movement of the buckstay or stand-pipe along the direction of the center line of that buckstay or stand-pipe can affect the angular position of the arm 58 for any given position of the charger horizontally with respect to the retort. Furthermore, fixity is secured in the horizontal distance between the buckstay or stand-pipe and the mouthpiece from the fact that the two are rigidly tied together by the take-off connections between them, a construction which would also prevent the buckstay or stand-pipe from twisting if there were any tendency for it to do so.

Figure 2:
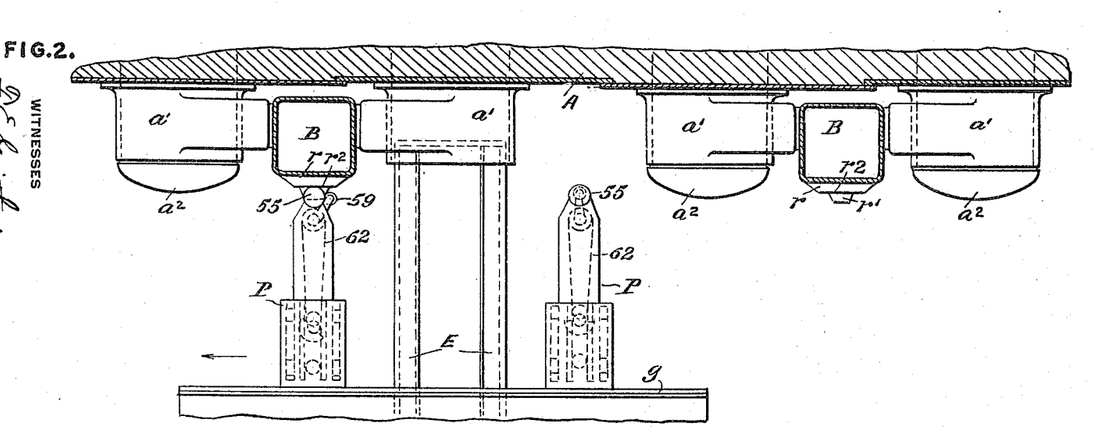
Fig. 2 is a detail diagrammatic view showing a portion of a retort structure, a portion of a charging machine, said machine having a charger entered into the open mouth-piece of one of the retorts, the view showing more particularly the duplicate arrangement of the controlling means.

As shown more particularly in Fig. 2, in constructions where a buck-stay or stand-pipe is interposed between the two rows of vertical retorts, with each row communicating with the stand-pipe or buck-stay, it is desirable to employ two of the members P, one on each side of the charger, these members being connected up to the signal lights in parallel so that either may act to provide the signal, it being understood, of course, that since the members R are carried by the buckstay or stand-pipe, the use of one member P would be effective with respect to one vertical row of retorts coöperating with that stand-pipe, but ineffective in connection with the other row; consequently, in installations of this character, we prefer to employ two independent members having a common connection with the signals.

As will be seen by reference to Figs. 3, 3$^a$ and 3$^b$, the cross connecting portion of contact $m'$ is of less width than the similar connecting portion of contact $m^2$. While these contacts may be exact duplicates of each other, we prefer to arrange them with this difference, the center lines, however, being in alinement, this arrangement permitting a less radius of action for the light $h'$, than the radius of action which will cause the closing of the circuit to the carriage motor $f'$, it being readily understood that the distance within which both fingers $k'$ and $k^2$ will be in engagement with contact $m'$ is much more restricted as to length than is the case with fingers $k^3$ and $k^4$ in connection with contact $m^2$. In this manner, surety is had that when the light $h'$ is properly lighted, the zone within which the carriage may move forward is completed so that the device as an entirety will practically force an accurate alining of the center lines of the retort and of the charger; since no visible indication is had of the completion of the circuit through contact $m^2$, the comparatively small enlargement of this contact will not affect the operation.

In the drawings, we have shown the charger as of the scoop type in which the scoops are moved bodily into and out of the retort. As will be obvious, the apparatus shown herein is adapted for use also with that type of charger in which the charge is placed into the retort by what may be termed a conveyer action, the operation of contact $m^2$ being obviously adapted to control the time when the charger mechanism for such conveyer structure may begin the operation. Similarly, the mechanism is adapted for use in connection with the type of charger in which the charge is carried into the retort by pressure, this contact $m^2$ serving to control the time when the pressure apparatus may begin its action. In each instance, the apparatus disclosed will permit of the operation of the charger only when the charging machine is in a certain position; the particular type of power apparatus which may be thus controlled will, of course, depend upon the type of charging mechanism.

Under these conditions, it will be readily understood that we do not desire to restrict ourselves to any particular type of charging mechanism but reserve the right to install the apparatus herein disclosed in connection with charging machines in general, regardless of the type of charging operation, in so far as such installations may fall within the spirit and scope of the invention as expressed in the accompanying claims.

What we claim is:—

1. In combination, a plurality of vertically alined retorts adapted to be charged individually, a charging machine having means for vertically positioning a charger relative to either of the retorts, and complemental means carried by the charging machine and the retort setting and rendered active by the travel of the machine for indicating the alinement position of the charger relative to a predetermined retort, said means including an element adjustable vertically with the charger.

2. In combination, a bench of retorts having its retorts positioned on parallel horizontal planes with a plurality or retorts on a plane, a charging machine having a charger adapted to charge individual retorts and movable vertically to locate the charger on either of said planes, and complemental means carried by the bench and machine and rendered active by the travel of the machine for indicating the alinement position of the charger relative to a predetermined retort on the plane to which the charger has been adjusted.

3. In combination, a bench of retorts having its retorts positioned on parallel horizontal planes with a plurality of retorts on a plane, a charging machine having a charger adapted to charge individual retorts and movable vertically to locate the charger on either of said planes, and complemental means carried by the bench and machine and rendered active by the travel of the machine for indicating the alinement position of the charger relative to a predetermined retort on the plane to which the charger has been adjusted, said means including an element carried by the machine and adjustable vertically with the charger.

4. In combination, a bench of retorts having its retorts positioned on parallel horizontal planes with a plurality of retorts on a plane, a charging machine having a charger adapted to charge individual retorts and movable vertically to locate the charger on either of said planes, and complemental means carried by the bench and machine and rendered active by the travel of the machine for indicating the alinement position of the charger relative to a predetermined retort on the plane to which the charger has been adjusted, said means including an element carried by the charging machine and adjustable vertically with the charger, said bench-supported means comprising individual members for each retort.

5. In combination, a stack of retorts having its retorts arranged in vertical and horizontal planes and adapted to be charged individually, a charging machine adapted to traverse the front of the stack and having a charger adjustable vertically to permit such individual charging, and complemental means carried by the machine and by the stack and rendered active by the travel of the machine for indicating the alinement position of the charger relative to an individual retort, said machine-carried means comprising an element adjustable vertically with the charger, said stack-carried means including a plurality of members also positioned on horizontal and vertical planes, each member being adapted to coöperate individually with said element.

6. In combination, a bench of retorts arranged in vertical and horizontal alinement, a vertically extending element interposed between the planes of two adjacent vertical rows of retorts, a charging machine having a charger vertically adjustable to permit individual charging of the retorts of either row, and complemental means carried by said machine and said vertically extending element for indicating the position of the charger relative to an individual retort of a row, said machine-carried means including a structure adjustable vertically with the charger, said element-carried means including a plurality of members spaced apart vertically a distance substantially equal to the distance between the center lines of the retorts of the row.

7. In combination, a bench of retorts arranged in vertical and horizontal alinement, a vertically extending element interposed between the planes of two adjacent vertical rows of retorts, the retort lids of one of said vertical rows opening in the same direction and opposing the direction of opening of the lids of the adjacent row, a charging machine having a charger adjustable vertically to individually charge the retorts of either row, said machine being movable laterally to position the charger in alinement with either row, and complemental means carried by the charger and by said element for indicating the relative positions of the charger and a predetermined retort, said machine-carried means including an indicating structure and a pair of members each adapted to individually operate the indicating structure, said members being vertically adjustable with the charger, said element-carried means including a plurality of members spaced vertically and each adapted to coöperate with either of said machine-carried members.

8. In combination, a bench of retorts arranged in vertical and horizontal alinement, a vertically extending element interposed between the planes of two adjacent vertical rows of retorts, the retort lids of one of said vertical rows opening in the same direction and opposing the direction of opening of the lids of the adjacent row, a charging machine having a charger adjustable vertically to individually charge the retorts of either row, said machine being movable laterally to position the charger in alinement with either row, and complemental means carried by the charger and by said element for indicating the relative positions of the charger and a predetermined retort, said machine-carried means including an indicating structure and a pair of members each adapted to individually operate the indicating structure, said members being vertically adjustable with the charger, said element-carried means including a plurality of members spaced vertically and each adapted to coöperate with either of said machine-carried members, said machine-carried members being positioned relative to the charger to limit the activity of coöperating members in the alining operation to the retorts of a predetermined row.

9. In combination, a bench of retorts arranged in vertical and horizontal alinement, a vertically extending element interposed between the planes of two adjacent vertical rows of retorts, a charging machine having a charger adjustable vertically to individually charge the retorts of either row, said machine being movable laterally to position the charger in alinement with either row, and complemental means carried by the charger and by said element for indicating the relative positions of the charger and a predetermined retort, said machine-carried means including an indicating structure and a pair of members each adapted to individually operate the indicating structure, said members being vertically adjustable with the charger, said element-carried means including a plurality of members spaced vertically and each adapted to coöperate with either of said machine-carried members.

10. In combination, a retort structure, a charging machine having a charger, motor-operated means for moving the charger into and out of a predetermined retort, indicating means on the charging machine, a circuit for said indicating means, and complemental means carried by the structure and machine for rendering the indicating means active when the charger is in approximate alinement with the retort, said means including make-and-break devices for said circuit.

11. In combination, a retort structure, a charging machine having a charger, motor-operated means for moving the charger into and out of a predetermined retort, an automatic control for the motor, indicating means on the charging machine, a circuit for said indicating means having an interruption in the automatic control, and complemental means carried by the structure and machine for rendering the indicating means active when the charger is in approximate alinement with the retort, said means including make-and-break devices for said circuit.

12. In combination, a retort structure, a charging machine having a charger, motor-operated means for moving the charger into and out of a predetermined retort, an automatic control for the motor movable in synchronism with the charger, indicating means on the charging machine, a circuit for said indicating means having an interruption in the automatic control, and complemental means carried by the structure and machine for rendering the indicating means active when the charger is in approximate alinement with the retort, said means including make-and-break devices for said circuit, the movement of said control operating to break the circuit at said interruption.

13. In combination, a charging machine having a charger adapted to move from and to an inactive position, motor-operated means for moving the charger from said position into and out of a predetermined retort, a circuit controlling the operations of the motor, an automatic control having an interruption in said circuit, said interruption being closed when the charger is in inactive position, alinement-indicating means also having an interruption in said circuit, and a control having an interruption in said circuit, said control being movable to close its interruption, whereby said motor may operate when said means is in position to close its interruption.

14. In combination, a charging machine having a charger adapted to move from and to an inactive position, motor-operated means for moving the charger from said position into and out of a predetermined retort, a circuit controlling the operations of the motor, an automatic control having an interruption in said circuit, said interruption being closed when the charger is in inactive position, alinement-indicating means also having an interruption in said circuit, and a control having an interruption in said circuit, said control being movable to close its interruption, whereby said motor may operate when said means is in position to close its interruption, said latter control being operable manually.

15. In combination, a charging machine having a charger adapted to move from and to an inactive position, motor-operated means for moving the charger from said position into and out of a predetermined retort, a circuit controlling the operations of the motor, an automatic control having an interruption in said circuit, said interruption being closed when the charger is in inactive position, alinement-indicating means also having an interruption in said circuit, and a control having an interruption in said circuit, said control being movable to close its interruption, whereby said motor may operate when said means is in position to close its interruption, said automatic control being operatively connected to the motor, the movements of the motor causing said control to open its interruption at a predetermined point in the travel of the charger.

16. In combination, a charging machine having a charger adapted to move from and to an inactive position, motor-operated means for moving the charger from said position into and out of a predetermined retort, a circuit controlling the operations of the motor, an automatic control having an interruption in said circuit, said interruption being closed when the charger is in inactive position, alinement-indicating means also having an interruption in said circuit, and a control having an interruption in said circuit, said control being movable to close its interruption, whereby said motor may operate when said means is in position to close its interruption, said automatic control being operatively connected to the motor, the movements of the motor causing said control to open its interruption at a predetermined point in the travel of the charger, said circuit having an additional interruption in the automatic control, said interruption being ineffective when said first named interruption is closed.

17. In combination, a charging machine having a charger adapted to move from and to an inactive position, motor-operated means for moving the charger from said position into and out of a predetermined retort, a circuit controlling the operations of the motor, an automatic control having an interruption in said circuit, said interruption being closed when the charger is in inactive position, alinement-indicating means also having an interruption in said circuit, and a control having an interruption in said circuit, said control being movable to close its interruption, whereby said motor may operate when said means is in position to close its interruption, said automatic control being operatively connected to the motor, the movements of the motor causing said control to open its interruption at a predetermined point in the travel of the charger, said additional interruption being closed by the travel of the control.

18. In combination, a charging machine having a charger adapted to move from and to an inactive position, motor-operated means for moving the charger from said position into and out of a predetermined retort, a circuit controlling the operations of the motor, an automatic control having an interruption in said circuit, said interruption being closed when the charger is in inactive position, alinement-indicating means also having an interruption in said circuit, and a control having an interruption in said circuit, said control being movable to close its interruption, whereby said motor may operate when said means is in position to close its interruption, said automatic control being operatively connected to the motor, the movements of the motor causing said control to open its interruption at a predetermined point in the travel of the charger, said additional interruption being closed by the travel of the control, the closing of said latter interruption rendering the interruption of the alinement-indicating means ineffective to break the circuit.

19. In combination, a retort structure, a traveling charging machine having a charger, and complemental means carried respectively by said structure and machine for indicating the alinement of charger and retort, said means including a movable member carried by the machine, and a member projecting from the structure into the path of the machine-carried member, said structure-carried member acting to move the machine-carried member under the travel movements of the machine.

20. In combination, a retort structure, a traveling charging machine having a charger, and complemental means carried respectively by said structure and machine for indicating the alinement of charger and retort, said means including a movable member carried by the machine, and a member projecting from the structure into the path of the machine-carried member, said structure-carried member acting to move the machine-carried member under the travel movements of the machine, said structure-carried member having a configuration to vary the movements of the machine-carried member.

21. In combination, a retort structure, a traveling charging machine having a charger, and complemental means carried respectively by said structure and machine for indicating the alinement of charger and retort, said means including a movable member carried by the machine, and a member projecting from the structure into the path of the machine-carried member, said structure-carried member acting to move the machine-carried member under the travel movements of the machine, said machine-carried member having a pivotal movement, whereby variations in movements of the movable member will be provided by the travel of the machine.

22. In combination, a retort structure, a traveling charging machine having a charger, and complemental means carried respectively by said structure and machine for indicating the alinement of charger and retort, said means including a movable member carried by the machine, and a member projecting from the structure into the path of the machine-carried member, said structure-carried member acting to move the machine-carried member under the travel movements of the machine, said structure-carried member being adapted to provide both reciprocating and pivotal movements to the machine-carried member during travel of the machine.

23. In combination, a retort structure, a traveling charging machine having a charger, and complemental means carried respectively by said structure and machine for indicating the alinement of charger and retort, said means including a movable member carried by the machine, and a member projecting from the structure into the path of the machine-carried member, said structure-carried member acting to move the machine-carried member under the travel movements of the machine, said structure-carried member being adapted to provide both reciprocating and pivotal movements to the machine-carried member during travel of the machine, said reciprocating movements being in advance of the pivotal movements.

24. In combination, a retort structure, a traveling charging machine having a motor-operating charger, a circuit for controlling the operations of said motor, and complemental means carried respectively by said structure and machine for indicating the alinement of charger and retort, said means including a movable member carried by the machine and having an interruption in the motor-controlling circuit, and a member projecting from the structure into the path of the machine-carried member, said structure-carried member acting to move the machine-carried member to close the circuit under the travel movements of the machine.

25. In combination, a retort structure, a traveling charging machine having a motor-operated charger, a circuit for controlling the operations of said motor, and complemental means carried respectively by said structure and machine for indicating the alinement of charger and retort, said means including a movable member carried by the machine and having an interruption in the motor-controlling circuit, and a member projecting from the structure into the path of the machine-carried member, said structure-carried member acting to move the machine-carried member to close the circuit under the travel movements of the machine, said members being relatively positioned to provide said circuit-closing when the charger and retort are in substantial alinement.

26. In combination, a retort structure, a traveling charging machine having a motor-operated charger and also carrying indicating means, circuits for said indicating means for controlling the operations of the motor, and complemental means carried respectively by said structure and machine for controlling the making and breaking of said circuits, said means including a movable member carried by the machine and having interruptions in said circuits, and a member projecting from the structure into the path of the machine-carried member, said structure-carried member acting to move the machine-carried member to close said interruptions under the travel movements of the machine.

27. In combination, a retort structure, a traveling charging machine having a motor-operated charger and also carrying indicating means, circuits for said indicating means for controlling the operations of the motor, and complemental means carried respectively by said structure and machine for controlling the making and breaking of said circuits, said means including a movable member carried by the machine and having interruptions in said circuits, and a member projecting from the structure into the path of the machine-carried member, said structure-carried member acting to move the machine-carried member to close said interruptions under the travel movements of the machine, the closing of an interruption in the indicating means circuit being in advance of the closing of the interruption in the motor control circuit.

28. In combination, a retort structure, a traveling charging machine having a motor-operated charger and also carrying indicating means, circuits for said indicating means for controlling the operations of the motor, and complemental means carried respectively by said structure and machine for controlling the making and breaking of said circuits, said means including a movable member carried by the machine and having interruptions in said circuits, and a member projecting from the structure into the path of the machine-carried member, said structure-carried member acting to move the machine-carried member to close said interruptions under the travel movements of the machine, the movement of said machine-carried member to a predetermined position serving to close the interruptions of both circuits to provide concurrent action of the indicating and motor-control circuits.

29. In combination, a retort structure, a traveling charging machine having a motor-operated charger and also carrying indicating means, circuits for said indicating means for controlling the operations of the motor, and complemental means carried respectively by said structure and machine for controlling the making and breaking of said circuits, said means including a movable member carried by the machine and having interruptions in said circuits, and a member projecting from the structure into the path of the machine-carried member, said structure-carried member acting to move the machine-carried member to close said interruptions under the travel movements of the machine, the movement of said machine-carried member to a predetermined position serving to close the interruptions of both circuits to provide concurrent action of the indicating and motor-control circuits, variations from such position by the machine-carried member to close the interruptions being less in length in the indicating circuit than in the motor-control circuit.

30. In retort charging machines, means for indicating the alining position of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator.

31. In retort charging machines, means for indicating the relative positions of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator, said device including a pair of contacts out of alinement, and a connector adapted to bridge said contacts under the shifting movements of the device.

32. In retort charging machines, means for indicating the relative positions of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator, said device including a pair of contacts out of alinement, and a connector adapted to bridge said contacts under the shifting movements of the device, said contacts and connector being movable relatively to each other.

33. In retort charging machines, means for indicating the relative positions of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator, said device including a pair of alined contacts and a third contact out of alinement with said pair, a connecting member for said pair of contacts, and a connecting member for said third and one of the pair of alined contacts, said connecting members being operative in succession during the shifting movements of the device.

34. In retort charging machines, means for indicating the relative positions of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator, said device including a pair of alined contacts and a third contact out of alinement with said pair, a connecting member for said pair of contacts, and a connecting member for said third and one of the pair of alined contacts, said connecting members being operative in succession during the shifting movements of the device, with the pair-connecting member operative in advance.

35. In retort charging machines, means for indicating the relative positions of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator, said device including a pair of alined contacts and a third contact out of alinement with said pair, a connecting member for said pair of contacts, and a connecting member for said third and one of the pair of alined contacts, said connecting members being operative in succession during the shifting movements of the device, with the pair-connecting member succeeding the operation of the other member.

36. In retort charging machines, means for indicating the relative positions of the charger and retort to be charged during travel of the machine, said means including a circuit, an indicator in said circuit, and a make-and-break device in said circuit shiftable under the machine travel movements, said device normally retaining the circuit broken, the shifting movements of the device completing the circuit to operate the indicator, said device including a pair of contacts out of alinement, and a connector adapted to bridge said contacts under the shifting movements of the device, said connector having a Z-shaped configuration.

37. In retort charging machines, a motor-operated charger, a circuit for controlling the operations of said motor, and means for indicating the relative positions of the charger and retort to be charged during the travel of the machine and for controlling the time of operation of the motor, said means including an indicator circuit and a motor-control circuit, an indicator in said indicator circuit, and a make-and-break device in said circuit shiftable under the travel movements of the machine, said device normally retaining the circuits broken, the shifting movements of the device completing the circuit to operate the indicator and close the motor control circuit.

38. In retort charging machines, a motor-operated charger, a circuit for controlling the operations of said motor, and means for indicating the relative positions of the charger and retort to be charged during the travel of the machine and for controlling the time of operation of the motor, said means including an indicator circuit and a motor-control circuit, an indicator in said indicator circuit, and a make-and-break device in said circuits shiftable under the travel movements of the machine, said device normally retaining the circuits broken, the shifting movements of the device completing the circuit to operate the indicator and close the motor control circuit, said device including two pairs of contacts, the contacts of each pair being out of alinement with each other, independent connectors for connecting the contacts of each pair, said motor control circuit extending from a contact of one pair to a contact of the other pair, said circuits extending to the other contacts of said pairs, whereby the bridging of said pairs will complete both circuits.

39. In retort charging machines, a motor-operated charger, a circuit for controlling the operations of said motor, and means for indicating the relative positions of the charger and retort to be charged during the travel of the machine and for controlling the time of operation of the motor, said means including an indicator circuit and a motor-control circuit, an indicator in said indicator circuit, and a make-and-break device in said circuits shiftable under the travel movements of the machine, said device normally retaining the circuits broken, the shifting movements of the device completing the circuit to operate the indicator and close the motor control circuit, said device including two pairs of contacts, the contacts of each pair being out of alinement with each other, independent connectors for connecting the contacts of each pair, said motor control circuit extending from a contact of one pair to a contact of the other pair, said circuits extending to the other contacts of said pairs, whereby the bridging of said pairs will complete both circuits, one of said connectors having a width less than the other to restrict the amount of variation from a predetermined position of the device while maintaining the circuits closed.

40. In combination, a retort structure, a charging machine having a charger and adapted to travel parallel to a face of the retort, work-performing apparatus on the machine, said apparatus including a circuit, a make-and-break device carried by the machine and having a pivotally mounted arm projecting toward the retorts and normally extending in a plane at right angles to the direction of travel of the machine, means carried by the retort structure for varying the angularity of said arms to said normal plane, and means whereby said angular movements of the arm will operate said device to make and break the circuit.

41. In combination, a retort structure, a charging machine having a charger and adapted to travel parallel to a face of the retort, work-performing apparatus on the machine, said apparatus including a circuit, a make-and-break device carried by the machine and having a pivotally mounted arm projecting toward the retorts and normally extending in a plane at right angles to the direction of travel of the machine, means carried by the retort structure for varying the angularity of said arm to said normal plane, and means whereby said angular movements of the arm will operate said device to make and break the circuit, said charger and the retort to be charged being positioned relatively to said arm and said structure-carried means respectively as to provide definite movements of said arm during travel of the machine to place the charger in alinement with the retort.

42. In combination, work-performing apparatus including a circuit, a make-and-break device in said circuit, said device comprising a support, a fixed member carried by the support, a pivotal member also carried by said support and adapted to coöperate with the fixed member to complete the circuit, a pivotal arm on said support and projecting therefrom in a normal plane, said arm being operatively connected to said pivotal member, and means for moving said arm on its pivot to change its angularity relative to said normal plane, said arm movements acting to cause the make-and-break operations of said circuit.

43. In combination, work-performing apparatus including a circuit, a make-and-break device in said circuit, said device comprising a support, a fixed member carried by the support, a pivotal member also carried by said support and adapted to coöperate with the fixed member to complete the circuit, a pivotal arm on said support and projecting therefrom in a normal plane, said arm being operatively connected to said pivotal member, and means for moving said arm on its pivot to change its angularity relative to said normal plane, said arm movements acting to cause the make-and-break operations of said circuit, said support also having a reciprocating movement, and means for imparting such movements to the support.

44. In combination, work-performing apparatus including a circuit, a make-and-break device in said circuit, said device comprising a support, a fixed member carried by the support, a pivotal member also carried by said support and adapted to coöperate with the fixed member to complete the circuit, a pivotal arm on said support and projecting therefrom in a normal plane, said arm being operatively connected to said pivotal member, and means for moving said arm on its pivot to change its angularity relative to said normal plane, said arm movements acting to cause the make-and-break operations of said circuit, said support also having a reciprocating movement, and means for imparting such movements to the support, the movement in one direction being in advance of the movement of the arm from its normal plane.

45. In combination, work-performing apparatus including a circuit, a make-and-break device in said circuit, said device comprising a support, a fixed member carried by the support, a pivotal member also carried by said support and adapted to coöperate with the fixed member to complete the circuit, a pivotal arm on said support and projecting therefrom in a normal plane, said arm being operatively connected to said pivotal member, and means for moving said arm on its pivot to change its angularity relative to said normal plane, said arm movements acting to cause the make-and-break operations of said circuit, said support also having a reciprocating movement, and means for imparting such movements to the support, the movement in one direction being in advance of the movement of the arm from its normal plane, and means for automatically returning said support upon return of the arm to such normal plane.

46. In combination, work-performing apparatus including a plurality of circuits, a make-and-break device operative to control each of said circuits, said device comprising a support, fixed contact members carried by said support, movable contacts carried by said support and adapted to coöperate with the fixed contacts, a pivotally mounted arm carried by the support and operatively connected to said movable contacts to provide synchronous movement therebetween, said arm normally projecting in a definite plane, and means for shifting the arm on its pivot to provide an angularity of the arm with respect to said normal plane.

47. In combination, work-performing apparatus including a plurality of circuits, a make-and-break device operative to control each of said circuits, said device comprising a support, fixed contact members carried by said support, movable contacts carried by said support and adapted to coöperate with the fixed contacts, a pivotally mounted arm carried by the support and operatively connected to said movable contacts to provide synchronous movements therebetween, said arm normally projecting in a definite plane, and means for shifting the arm on its pivot to provide an angularity of the arm with respect to said normal plane, said circuits being broken when the arm is in such normal plane, said contacts being relatively positioned to make and break said circuits successively during continuous travel of the arm in one direction.

48. In combination, work-performing apparatus including a plurality of circuits, a make-and-break device operative to control each of said circuits, said device comprising a support, fixed contact members carried by said support, movable contacts carried by said support and adapted to coöperate with the fixed contacts, a pivotally mounted arm carried by the support and operatively connected to said movable contacts to provide synchronous movements therebetween, said arm normally projecting in a definite plane, and means for shifting the arm on its pivot to provide an angularity of the arm with respect to said normal plane, said circuits being broken when said arm is in such normal plane, said contacts being relatively located to prevent concurrent make-and-break actions on the several circuits, the movement of said arm continuously in one direction acting to make and break each of said circuits.

49. In combination, work-performing apparatus including a plurality of circuits, a support carrying fixed contacts in said circuits, movable contacts adapted to coöperate with said fixed contacts, a pivotal arm projecting from said support and normally in a definite plane, said arm being operatively connected to said movable contacts to provide synchronous movements therebetween, and means for shifting said arm to provide an angularity with said normal plane, said shifting movements acting to make and break a circuit, said support and means being movable relatively to each other in a direction at right angles to said plane.

50. In combination, work-performing apparatus including a plurality of circuits, a support carrying fixed contacts in said circuits, movable contacts adapted to coöperate with said fixed contacts, a pivotal arm projecting from said support and normally in a definite plane, said arm being operatively connected to said movable contacts to provide synchronous movements therebetween, and means for shifting said arm to provide an angularity with said normal plane, said shifting movements acting to make and break a circuit, said support being movable in a direction at right angles to said normal plane.

51. In combination, work-performing apparatus including a plurality of circuits, a support carrying fixed contacts in said circuits, movable contacts adapted to coöperate with said fixed contacts, a pivotal arm projecting from said support and normally in a definite plane, said arm being operatively connected to said movable contacts to provide synchronous movements therebetween, and means for shifting said arm to provide an angularity with said normal plane, said shifting movements acting to make and break a circuit, said support being movable in a direction at right angles to said normal plane, said means being located in the path of travel of the support and including a member having an inclined face adapted to coact with said arm to provide said shifting movements.

52. In combination, work-performing apparatus including a plurality of circuits, a support, a casing mounted on said support to reciprocate thereon, fixed contacts carried by the casing, a pivotally mounted element within the casing and carrying contacts adapted to coöperate with the fixed contacts, an arm pivotally carried by the projecting portion of said casing said arm normally projecting in a definite plane, connections between said arm and said elements to provide synchronous movements therebetween, means for moving said support in one direction, and means for shifting said arm to provide an angularity thereof to said normal plane, the movements of said arm acting to make and break a circuit.

53. In combination, work-performing apparatus including a plurality of circuits, a support, a casing mounted on said support to reciprocate thereon, fixed contacts carried by the casing, a pivotally mounted element within the casing and carrying contacts adapted to coöperate with the fixed contacts, an arm pivotally carried by the projecting portion of said casing said arm normally projecting in a definite plane, connections between said arm and said elements to provide synchronous movements therebetween, means for moving said support in one direction, and means for shifting said arm to provide an angularity thereof to said normal plane, the movements of said arm acting to make and break a circuit, said casing-moving means embodying a member having inclined ends adapted to form a track leading to and from a surface, the length of which retains the support in predetermined position during the shifting movements of the arm.

54. In combination, work-performing apparatus including a plurality of circuits, a support, a casing mounted on said support to reciprocate thereon, fixed contacts carried by the casing, a pivotally mounted element within the casing and carrying contacts adapted to coöperate with the fixed contacts, an arm pivotally carried by the projecting portion of said casing said arm normally projecting in a definite plane, connections between said arm and said elements to provide synchronous movements therebetween, means for moving said support in one direction, and means for shifting said arm to provide an angularity thereof to said normal plane, the movements of said arm acting to make and break a circuit, and means carried by the casing for returning said arm to its position in said normal plane when out of contact with its shifting means.

In testimony whereof we affix our signatures in presence of two witnesses.

HENRY A. CARPENTER.
ARTHUR W. WARNER.

Witnesses:
ADA M. STEELE,
M. J. STEELE.

Copies of this patent may be obtained for five cents each, by addressing the "Commissioner of Patents, Washington, D. C."